(12) United States Patent
Huang et al.

(10) Patent No.: US 8,644,381 B2
(45) Date of Patent: Feb. 4, 2014

(54) APPARATUS FOR REFERENCE PICTURE RESAMPLING GENERATION AND METHOD THEREOF AND VIDEO DECODING SYSTEM USING THE SAME

(75) Inventors: Yen-Ju Huang, Kaohsiung (TW); Chao-Tsung Huang, Kaohsiung (TW); Tze-Sing Huang, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 697 days.

(21) Appl. No.: 12/403,341

(22) Filed: Mar. 12, 2009

(65) Prior Publication Data

US 2010/0150231 A1 Jun. 17, 2010

(30) Foreign Application Priority Data

Dec. 11, 2008 (TW) .............................. 97148283 A

(51) Int. Cl.
*H04N 7/12* (2006.01)
(52) U.S. Cl.
USPC .................................................... 375/240.12
(58) Field of Classification Search
USPC ........................................ 375/240.01, 240.27
IPC ............................................................ H04N 7/12
See application file for complete search history.

(56) References Cited

U.S. PATENT DOCUMENTS

| | | | |
|---|---|---|---|
| 6,310,915 B1 | 10/2001 | Wells et al. | |
| 6,493,392 B1 | 12/2002 | Moon et al. | |
| 6,996,178 B1 | 2/2006 | Zhang et al. | |
| 2004/0213345 A1 | 10/2004 | Holcomb et al. | |
| 2005/0123274 A1 | 6/2005 | Crinon et al. | |
| 2005/0195899 A1* | 9/2005 | Han | 375/240.21 |
| 2005/0259739 A1* | 11/2005 | Nakamura et al. | 375/240.16 |
| 2006/0233250 A1* | 10/2006 | Cha et al. | 375/240.12 |
| 2007/0230572 A1* | 10/2007 | Koto et al. | 375/240.12 |
| 2010/0111183 A1* | 5/2010 | Jeon et al. | 375/240.16 |

OTHER PUBLICATIONS

"Office Action of Taiwan counterpart application" issued on Mar. 28, 2012, p1-p10, in which the listed references were cited.

* cited by examiner

*Primary Examiner* — Dave Czekaj
*Assistant Examiner* — Tracy Li
(74) *Attorney, Agent, or Firm* — Jianq Chyun IP Office

(57) ABSTRACT

The exemplary embodiments of the present invention are direct to a method for generating a resampling reference picture and an apparatus and video decoding system using this method. The video image decoding system is used to decode a bit stream, so as to obtain a current frame. The method for generating a resampling reference picture includes following steps: (a) looking ahead specific information of next x frames of the current frame in the bit stream; (b) determining whether to generate a resampling reference picture according to the specific information of the next x frames.

37 Claims, 12 Drawing Sheets

APPARATUS FOR REFERENCE PICTURE RESAMPLING GENERATION AND METHOD THEREOF AND VIDEO DECODING SYSTEM USING THE SAME

CROSS-REFERENCE TO RELATED APPLICATION

This application claims the priority benefit of Taiwan application serial no. 97148283, filed on Dec. 11, 2008. The entirety of the above-mentioned patent application is hereby incorporated by reference herein and made a part of specification.

BACKGROUND OF THE INVENTION

1. Field of the Invention

The present invention relates to a video decoding system. More particularly, the present invention relates to a video decoding system capable of generating a resampling reference picture, and a resampling reference picture generation apparatus and a method thereof.

2. Description of Related Art

During a video encoding process, a video encoder generally divides an image frame into macroblocks which have the same size with a unit of 16×16 pixels, wherein the macroblocks are not overlapped. Then, the video encoder performs an intra prediction and an inter prediction to the macroblocks, so as to eliminate a spatial and a temporal redundancy. Thereafter, the video encoder performs a discrete cosine transform (DCT), a quantization and an entropy coding on a residual block obtained by subtracting the original block from the prediction block, so as to obtain a bit stream.

Next, referring to FIG. 1, FIG. 1 is a system block diagram illustrating a conventional video decoding system 10. The conventional video decoding system 10 includes a variable length decoding (VLD) unit 11, an inversed quantization (IQ) unit 12, an inversed discrete cosine transform (IDCT) unit 13, an adder 14, an in-loop filter 15, a selector 16, an intra prediction unit 17, a motion compensation unit 18 and a frame memory 19. Wherein, coupling relations of the devices are shown in FIG. 1, and are not described herein.

A decoding flow of the video decoding system 10 is reversed to the aforementioned encoding flow. First, the VLD unit 11 performs an entropy decoding on the bit stream. Next, the IQ unit 12 performs an inversed quantization on the output stream of the VLD unit 11. Thereafter, the IDCT unit 13 performs an inversed discrete cosine transform to an output stream of the IQ unit 12 to obtain the residual block. Next, the adder 14 adds the residual block to an intra prediction block or an inter prediction block to obtain one block of a reconstruction frame. Wherein, the intra prediction unit 17 is used for generating the intra prediction block, and the motion compensation unit 18 generates the inter prediction block according to a plurality of image frames stored in the frame memory 19.

Finally, the in-loop filter 15 of the video decoding system 10 filters the block of the reconstruction frame, so as to obtain one block of a relatively smooth output frame without grains, and transmits the block of the output frame to a display device or the frame memory 19 to serve as one block of a reference picture for a next inter prediction. Wherein, the reference picture used for the next inter prediction has to be an I frame or a P frame.

Moreover, in most of video standards, a frame that can be reconstructed without referring to any frame during the decoding process is referred to as the I frame, while a frame that is reconstructed by referring to a previous non-B frame is referred to as the P frame, and a frame that is reconstructed by simultaneously referring to a previous non-B frame and a future non-B frame is referred to as the B frame, wherein, the non-B frame refers to the I frame or the P frame.

Referring to FIG. 2, FIG. 2 is a schematic diagram illustrating frames and display time displayed by a display device after a bit stream is decoded. As shown in FIG. 2, the frames displayed by the display device after the bit stream is decoded are sequentially an I frame I0, B frames B1-B3, a P frame P4, B frames B5-B7 and a P frame P8.

As described above, the I frame I0 can be reconstructed without referring to any frame, and the P frame can only be reconstructed by referring to the previous non-B frame. For example, reconstruction of the P frame P4 must refer to the I frame I0, and reconstruction of the P frame P8 must refer to the P frame P4. The B frame can only be reconstructed by simultaneously referring to the previous and the future non-B frames. For example, reconstructions of the B frames B1-B3 all refer to the I frame I0 and the P frame P4, and reconstructions of the B frames B5-B7 all refer to the P frames P4 and P8.

Next, referring to FIG. 3, FIG. 3 is a schematic diagram illustrating decoding time corresponding to the frames of FIG. 2. During the decoding process, a sequence of the generated reconstruction frames is different from that of the frames displayed on the display device. After the bit stream is decoded, the first generated frame is the I frame I0. Then, the P frame P4 is reconstructed by referring to the I frame I0. Thereafter, the B frames B1-B3 are sequentially reconstructed by referring to the P frame P4 and the I frame I0. Thereafter, the P frame P8 is reconstructed by referring to the P frame P4. Then, the B frames B5-B7 are sequentially reconstructed by referring to the P frames P4 and P8.

During the video encoding process, due to an insufficient channel bandwidth, a compression ratio has to be adjusted to satisfy the bandwidth limitation, and a commonly used method thereof is to adjust a quantization value or decrease a frame resolution. However, if the frame resolution is changed at the video decoding system, the reference picture has to be correspondingly amplified or minified to match a size and a shape of the frame to be predicted.

Referring to FIG. 4, FIG. 4 is a schematic diagram illustrating a reference picture R1 being adjusted to a reference picture R2. As described above, when a size and a shape of a next frame are different form those of the reference picture R1, the size and shape of the reference picture R1 have to be changed. In this example, the size and shape of the next frame are assumed to be different from the reference picture R2, so that the reference picture R1 is adjusted into the reference picture R2.

A reference picture resampling (RPR) algorithm is an algorithm for changing the size and shape of the reference picture before the reference picture is referred, so as to match the size and shape of the frame to be predicted.

A TMN 3.0 decoding program matching a H263+ standard, which is developed by the University of British Columbia of Canada is taken as an example. When the TMN 3.0 decoding program decodes each of the frames, if a resolution of a current frame is found to be different from the resolution of the reference picture, suitable resampling is first performed to the reference picture, and then the generated resampling reference picture is served as the reference picture for the current frame. Wherein, the suitable resampling of the reference picture is a down sampling or an up sampling of the reference picture.

Referring to FIG. 5, FIG. 5 is diagram illustrating a relation between decoding time and frames in a decoding process according to an algorithm applied by the TMN 3.0 decoding program. In the example of FIG. 5, the bit stream only includes I frames and P frames. During the decoding process of FIG. 5, reconstruction of the P frame P1 refers to the I frame I0, and reconstructions of the P frames P2 and P3 respectively refer to the P frames P1 and P2. It should be noted that the resolutions (i.e. the frame size) of the P frames P3 and P4 are different. Therefore, according to the algorithm applied by the TMN 3.0 decoding program, the reference picture resampling is first performed on the P frame P3 to generate the resampling reference picture P3' (i.e. the P frame P3'), and then reconstruction of the P frame P4 can refer to the P frame P3'. In the example, the reference picture resampling performed on the P frame P3 means that the P frame P3' is generated by performing the up sampling to the P frame P3.

The reconstructions of the P frames P5 and P6 respectively refer to the P frames P4 and P5, and the reconstructions of the P frames P8 and P9 respectively refer to the P frames P7 and P8. Since the resolutions of the P frames P6 and P7 are different, according to the algorithm applied by the TMN 3.0 decoding program, the reference picture resampling is first performed to P frame P6 to generate the resampling reference picture P6' (the P frame P6'), and then reconstruction of the P frame P7 can refer to the P frame P6'. In the example, the reference picture resampling performed on the P frame P6 means that the P frame P6' is generated by performing the down sampling to the P frame P3.

During the decoding process, according to the algorithm applied by the TMN 3.0 decoding program, resamplings of the P frames P3 and P6 have to be first performed to obtain the P frames P3' and P6' for providing references to the P frames P4 and P7, so as to successfully reconstruct the P frames P4 and P7. Therefore, when the P frames P4 and P7 are decoded, the TMN 3.0 decoding program inevitably increases an operation clock number and memory accessing times for a computer device executing such decoding program.

In summary, according to the algorithm applied by the TMN 3.0 decoding program, extra time is required for calculation, and accessing times of a memory are increased. Therefore, regarding a real-time video service, when the resolution of the reference picture is required to be changed, the frames probably cannot be displayed on the display device in real-time due to extra time consumption of the TMN 3.0 decoding program. Moreover, since the TMN 3.0 decoding program inevitably increases the memory accessing times when the resolution of the reference picture is changed, the required memory bandwidth has to be accordingly increased.

SUMMARY OF THE INVENTION

The present invention is related to a method for generating a resampling reference picture, a resampling reference picture generation apparatus and a video decoding system using the same.

The embodiment of the present invention provides a method for generating a resampling reference picture, which is executed in a video decoding system. The video decoding system is used to decode a bit stream, so as to obtain a current frame. The method for generating a resampling reference picture includes the following steps: (a) looking ahead specific information of next x frames of the current frame in the bit stream, wherein x is a natural number; (b) determining whether to generate the resampling reference picture according to the specific information of the next x frames.

The present invention provides a resampling reference picture generation apparatus, which is suitable for a video decoding system. The video decoding system is used to decode a bit stream, so as to obtain a current frame. The resampling reference picture generation apparatus includes a header look ahead unit and a resampling reference picture processing unit. The header look ahead unit and the resampling reference picture processing unit are mutually coupled. The header look ahead unit is used for looking ahead specific information of next x frames of the current frame in the bit stream, and outputting an indication signal according to the specific information of the next x frames, wherein x is a natural number. The resampling reference picture processing unit determines whether to generate the resampling reference picture according to the indication signal.

The present invention provides a video decoding system including a video decoding device and a resampling reference picture generation apparatus, wherein the video decoding device is coupled to the resampling reference picture generation apparatus. The resampling reference picture generation apparatus includes a header look ahead unit and a resampling reference picture processing unit. The header look ahead unit and the resampling reference picture processing unit are mutually coupled. The video decoding device is used to decode a bit stream, so as to obtain a current frame. The header look ahead unit is used for looking ahead specific information of next x frames of the current frame in the bit stream, and outputting an indication signal according to the specific information of the next x frames, wherein x is a natural number. The resampling reference picture processing unit determines whether to generate the resampling reference picture according to the indication signal.

The resampling reference picture generation apparatus, the method thereof and the video decoding system using the same can decode the bit stream and generate the resampling reference pictures in parallel, so that the video decoding system can simultaneously generate the reference pictures with different resolutions during a decoding process. Therefore, an operation clock number of a computer device can be reduced, and a requirement of a memory bandwidth can be greatly reduced due to data reuse.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

An algorithm applied by a conventional TMN 3.0 decoding program consumes extra time for calculation, and increases memory accessing times. Therefore, to resolve the above or other problems, a resampling reference picture generation apparatus, a method thereof and a video decoding system using the same provided by embodiments of the present invention can decode the bit stream and generate the resampling reference pictures in parallel when a resolution (i.e. a size) or shape of a frame is changed, so that a video decoding system can simultaneously generate the reference pictures with different resolutions during a decoding process.

Figure 6:
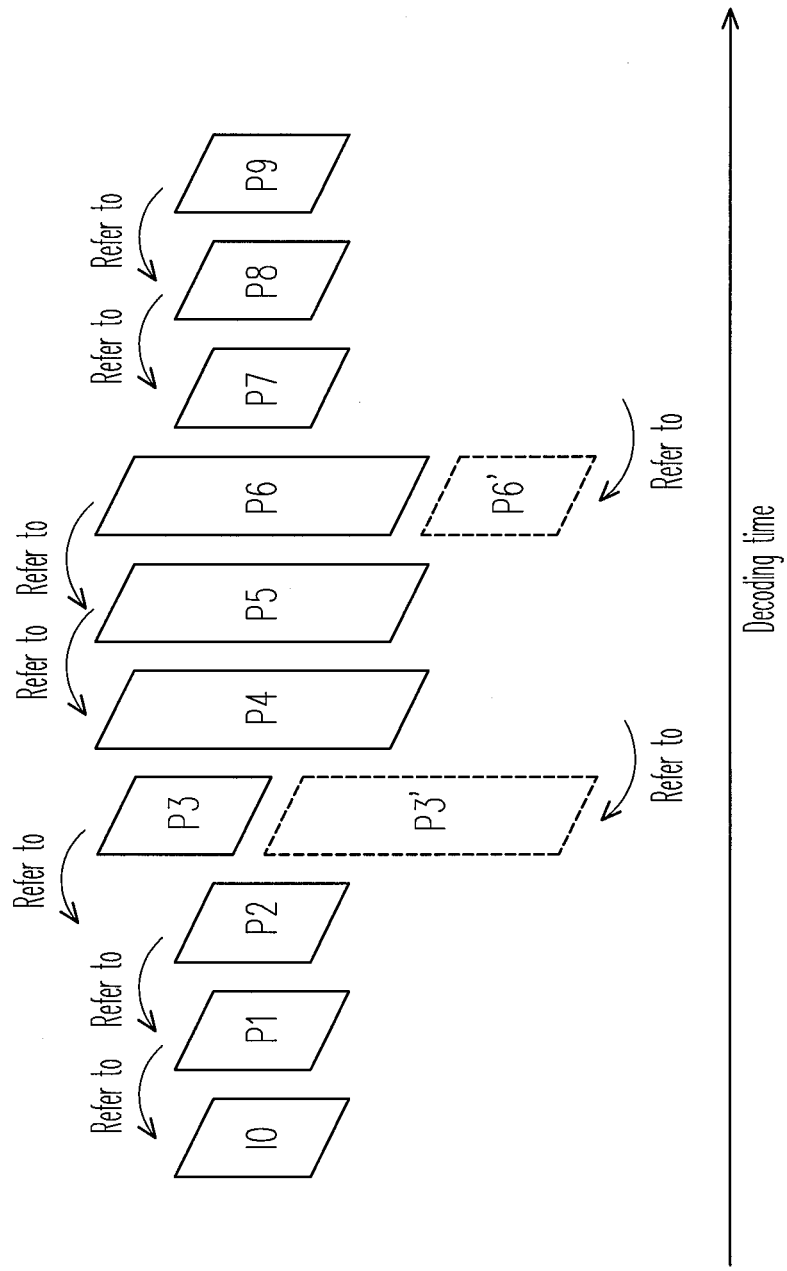
FIG. 6 is a schematic diagram illustrating a method for generating a resampling reference picture according to an embodiment of the present invention.

Referring to FIG. 6, FIG. 6 is a schematic diagram illustrating a method for generating a resampling reference picture according to an embodiment of the present invention. In the embodiment of FIG. 6, a received bit stream only includes an I frame and P frames. However, such embodiment is only an example, and the resampling reference picture generation apparatus, the method thereof and the video decoding system using the same provided by the embodiments of the present invention are not limited such embodiment. In other words, in other embodiments of the present invention, the method for generating the resampling reference picture, the apparatus and the video decoding system using the same can also be provided in case that the bit stream includes the I frames, the P frames and B frames.

Moreover, in the present embodiment, resolutions of P frames P3 and P4 are different, and resolutions of P frames P6 and P7 are different. Therefore, when the P frame P3 is reconstructed, if it is known in advance that the resolution of the next P frame P4 is different from that of the current P frame P3, the resolution information of the next P frame P4 can be temporarily stored in a storage apparatus, first. Then, while reconstruction of the P frame P3 is completed, a P frame P3' having the same resolution as that of the P frame P4 is generated according to the resolution information of the P frame P4, and the frame P3' is temporarily stored in the storage apparatus. Thereafter, when the P frame P4 is reconstructed, the P frame P4 can be directly reconstructed by referring to the P frame P3' temporarily stored in the storage apparatus.

Deduced by analogy, when the P frame P6 is reconstructed, if it is known that the resolution of the next P frame P7 is different from that of the current P frame P6, the resolution information of the next P frame P7 can be temporarily stored in the storage apparatus, first. Then, while reconstruction of the P frame P6 is completed, a P frame P6' having the same resolution to that of the P frame P7 is generated according to the resolution information of the P frame P7, and the frame P6' is temporarily stored in the storage apparatus. Thereafter, when the P frame P7 is reconstructed, the P frame P7 can be directly reconstructed while referring to the P frame P6' temporarily stored in the storage apparatus.

Moreover, it should be noted that though the change in the frame resolution is taken as an example in FIG. 6, actually, the change in the frame shape also requires a generation of the resampling reference picture. Therefore, generation of the resampling reference picture is not limited to the change in the frame resolution. In other words, when the resolution, the shape or a color plate, etc. of the next frame is changed, the current frame must be re-sampled to generate the corresponding resampling reference picture for the next frame to refer to.

Figure 7:
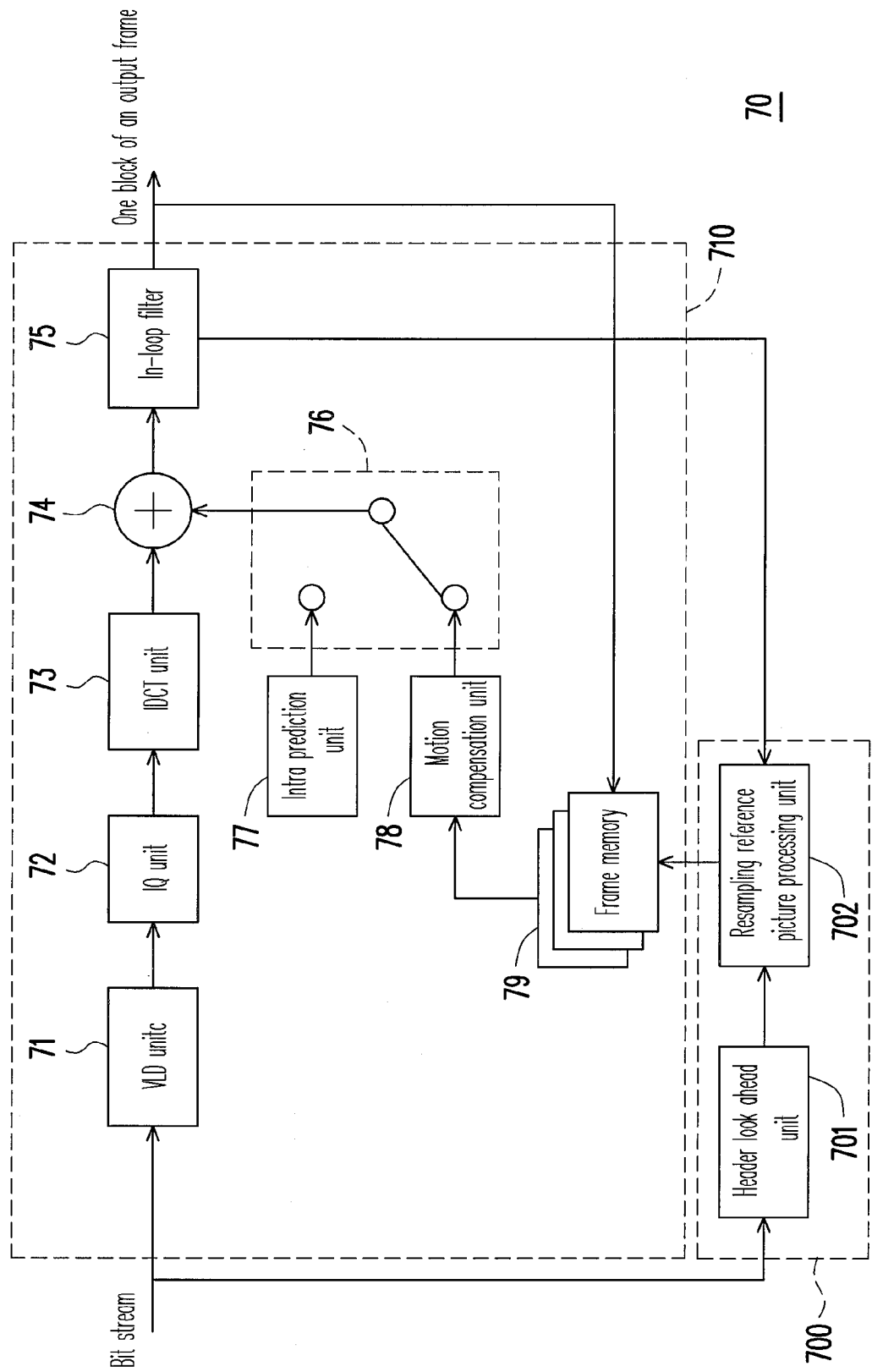
FIG. 7 is a system block diagram illustrating a video decoding system 70 according to an embodiment of the present invention.

Next, referring to FIG. 7, FIG. 7 is a system block diagram illustrating a video decoding system 70 according to an embodiment of the present invention. The video system 70 includes a resampling reference picture generation apparatus 700 and a video decoding device 710. The video decoding device 710 includes a variable length decoding (VLD) unit 71, an inversed quantization (IQ) unit 72, an inversed discrete cosine transform (IDCT) unit 73, an adder 74, an in-loop filter 75, a selector 76, an intra prediction unit 77, a motion compensation unit 78 and a frame memory 79. The resampling reference picture generation apparatus 700 includes a header look ahead unit 701 and a resampling reference picture processing unit 702.

The VLD unit 71 is coupled to the IQ unit 72, the IQ unit 72 is coupled to the IDCT unit 73, the IDCT unit 73 is coupled to the adder 74, the adder 74 is coupled to the in-loop filter 75 and the selector 76, the selector 76 is coupled to the intra prediction unit 77 and the motion compensation unit 78, the in-loop filter 75 is coupled to the frame memory 79 and the resampling reference picture generation apparatus 700, and the frame memory 79 is coupled to the motion compensation unit 78 and the resampling reference picture generation apparatus 700. The header look ahead unit 701 is coupled to the resampling reference picture processing unit 702, and the resampling reference picture processing unit 702 is coupled to the in-loop filter 75 and the frame memory 79.

Figure 8:
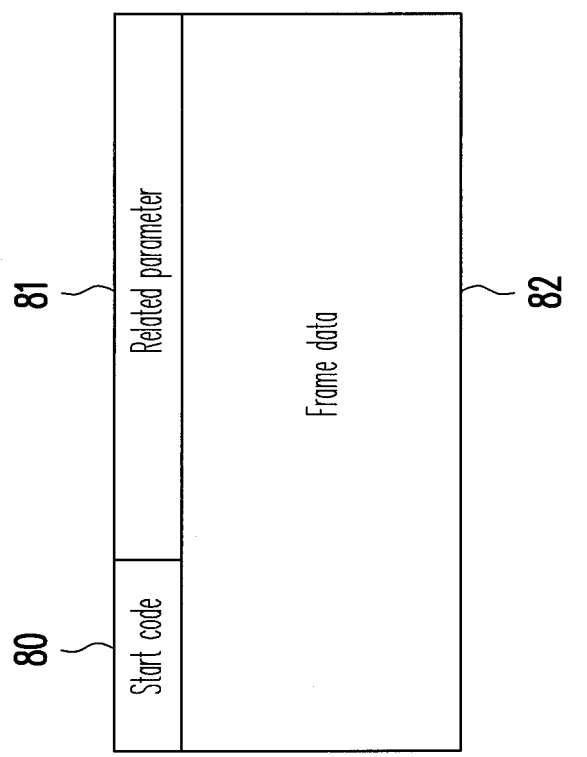
FIG. 8 is a schematic diagram illustrating a data format of a certain frame in a bit stream.

Before a function of each of the components of the video decoding system 70 is described, data included in the received bit stream is first explained. Referring to FIG. 8, FIG. 8 is a schematic diagram illustrating a data format of a certain frame in the bit stream. The data illustrated in FIG. 8 is data of a certain frame, and the received bit stream can include a plurality of data as that shown in FIG. 8. Wherein, the data shown in FIG. 8 includes a start code 80, a related parameter 81 and a frame data 82, etc.

The start code 80 is used for representing a start point of a corresponding frame thereof. Since the bit stream includes data of a plurality of the frames, the start code 80 can be used for representing the start point of the corresponding frame, and even used for representing whether the corresponding frame is an I frame, a P frame or a B frame. The related parameter 81 located behind the start code 80 includes parameters of such corresponding frame, for example, information such as a resolution, a shape, a quantization table and a color plate, etc. of the corresponding frame. The information contained in the related parameter 81 is used for providing the information required during the video decoding process, so as to successfully reconstruct such corresponding frame during the decoding process. Moreover, the frame data 82 located behind the related parameter 81 is used for reconstructing data of the corresponding frame during the decoding process.

Next, referring to FIG. 7 again, the video decoding device 710 is used for decoding the bit stream to obtain an output frame. The VLD unit 71 performs an entropy decoding on the bit stream, and the IQ unit 72 performs an inversed quantization to an output bit stream of the VLD unit 71. The IDCT unit 73 performs an inversed discrete cosine transform to an output bit stream of the IQ unit 72 to obtain a residual block, and the adder 74 adds the residual block to an intra prediction block or an inter prediction block to obtain one block of a reconstruction frame. Wherein, the intra prediction unit 77 is used for generating the intra prediction blocks, and the motion compensation unit 78 generates the inter prediction block according to a plurality of image frames stored in the frame memory 79. The in-loop filter 75 filters the block of reconstruction frame to obtain one block of a relatively smooth output frame without grains, and transmits the block of the output frame to a display device or the frame memory 79 to serve as one block of a reference picture for a next inter prediction.

Here, the current output frame is defined as a current frame, and the start codes and the related parameters of next x frames corresponding to the current frame in the bit stream are defined as specific information. Wherein, the related parameter of each of the next x frames includes resolution information or frame shape information. Next, functions of the components in the resampling reference picture generation apparatus 700 are described as follows.

The header look ahead unit 701 is used for looking ahead the specific information of the next x frames of the current frame in the bit stream, and outputting an indication signal according to the specific information of the next x frames, wherein x is a natural number. The resampling reference picture processing unit 702 determines whether to generate the resampling reference picture according to the indication signal.

Here, the bit stream only including the I frame and the P frame is used for describing the video decoding system 70. However, the present embodiment is not used for limiting the present invention. When the bit stream only includes the I frame and the P frame, x can be set to 1. Therefore, when the image resolution information or the image shape information contained in the specific information of the next P frame is different from that of the current frame, the indication signal output by the header look ahead unit 701 can enable the resampling reference picture processing unit 702. Then, the resampling reference picture processing unit 702 generates the resampling reference picture according to the next P frame and the specific information of the current frame, wherein the resolution and the frame shape of the resampling reference picture are the same as that of the next P frame.

It should be noted that the resampling reference picture generated by the resampling reference picture processing unit 702 can be stored in the resampling reference picture processing unit 702 or the frame memory 79. Then, during the decoding process of the next P frame, the resampling reference picture can be directly referred to, and further generation of a resampling reference picture is unnecessary. Therefore, by applying the header look ahead unit 701 to look ahead the specific information of the next P frame, when the video decoding system 70 decodes the current frame, it can simultaneously generate the resampling reference picture, so as to reduce an operation clock number and a bandwidth requirement of the frame memory 79.

Moreover, if the next frame of the current frame is the I frame, since the I frame can be reconstructed without referring to any frame, regardless of whether the resolution or the frame shape of the next I frame being the same as that of the current image, the indication signal output by the header look ahead unit 701 disables the resampling reference picture processing unit 702. If the resolution and the frame shape of the next P frame is the same as that of the current frame, it represents that reconstruction of the next P frame can directly refer to the current frame, and generation of the resampling reference picture is unnecessary. In such case, the indication signal output by the header look ahead unit 701 can disable the resampling reference picture processing unit 702.

Figure 1:
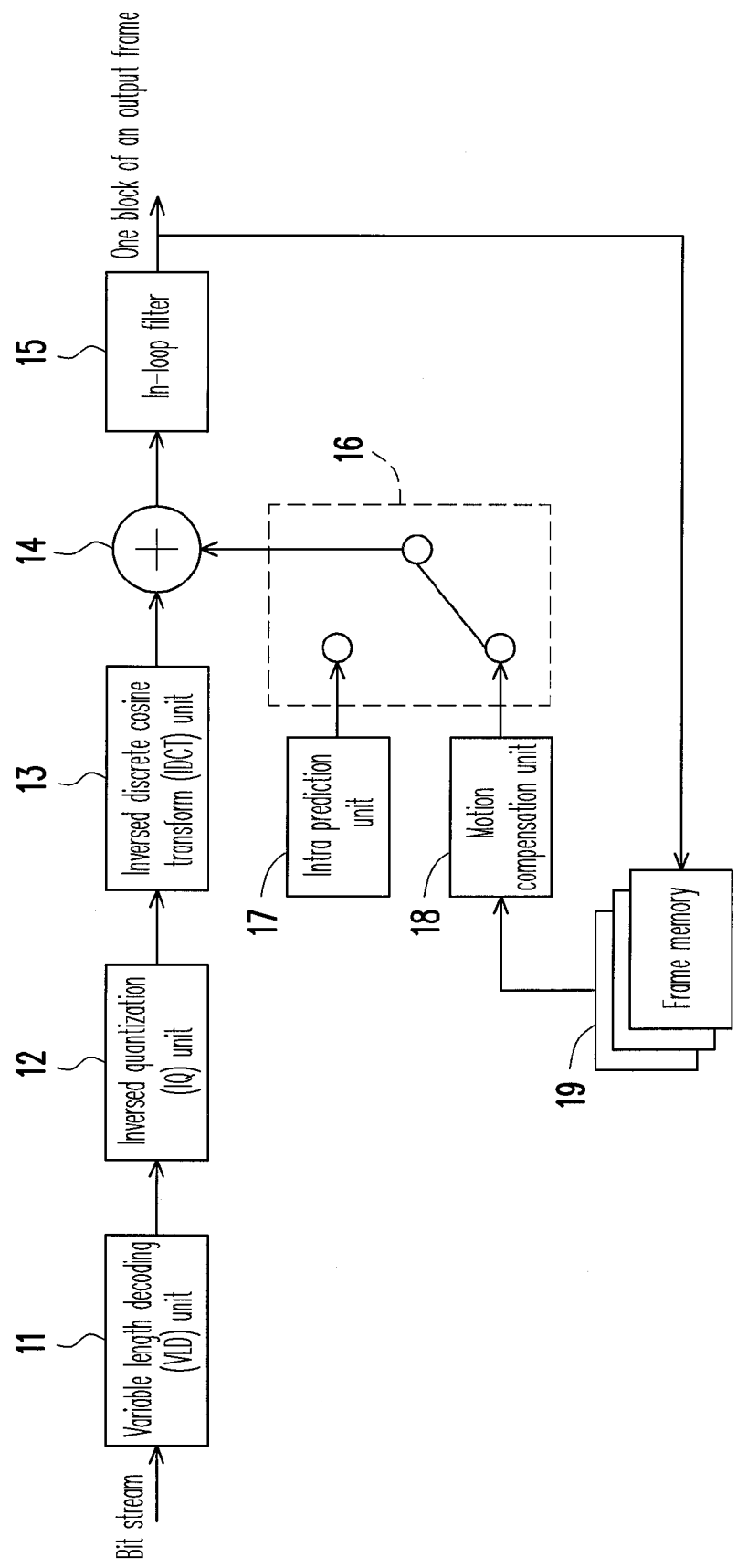
FIG. 1 is a system block diagram illustrating a conventional video decoding system 10.
Figure 2:
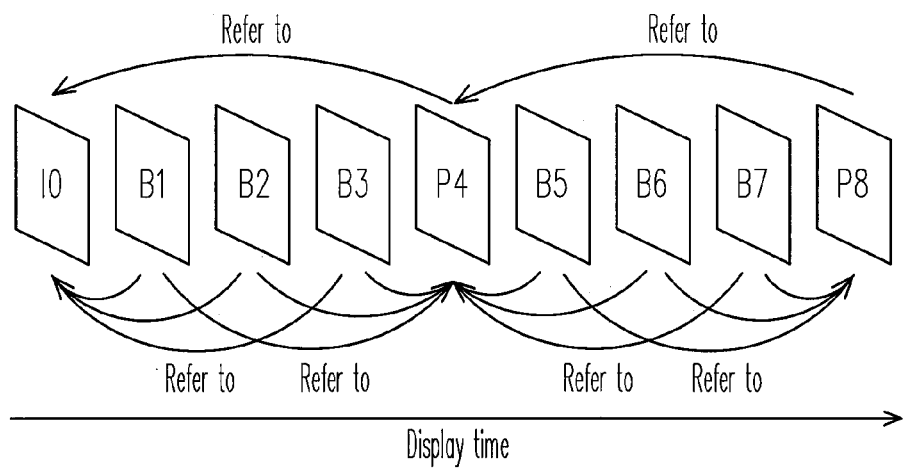
FIG. 2 is a schematic diagram illustrating frames and display time displayed by a display device after a bit stream is decoded.
Figure 3:
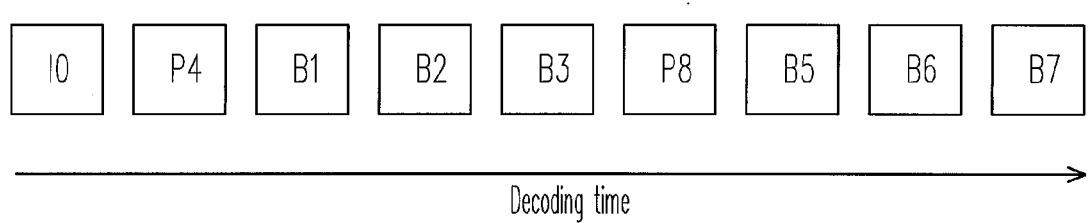
FIG. 3 is a schematic diagram illustrating decoding time corresponding to the frames of FIG. 2.
Figure 4:
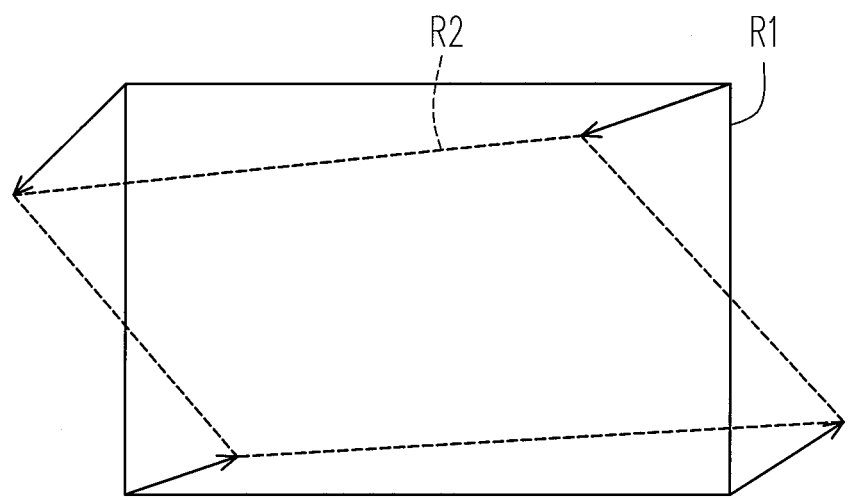
FIG. 4 is a schematic diagram illustrating a reference picture R1 being adjusted to a reference picture R2.
Figure 5:
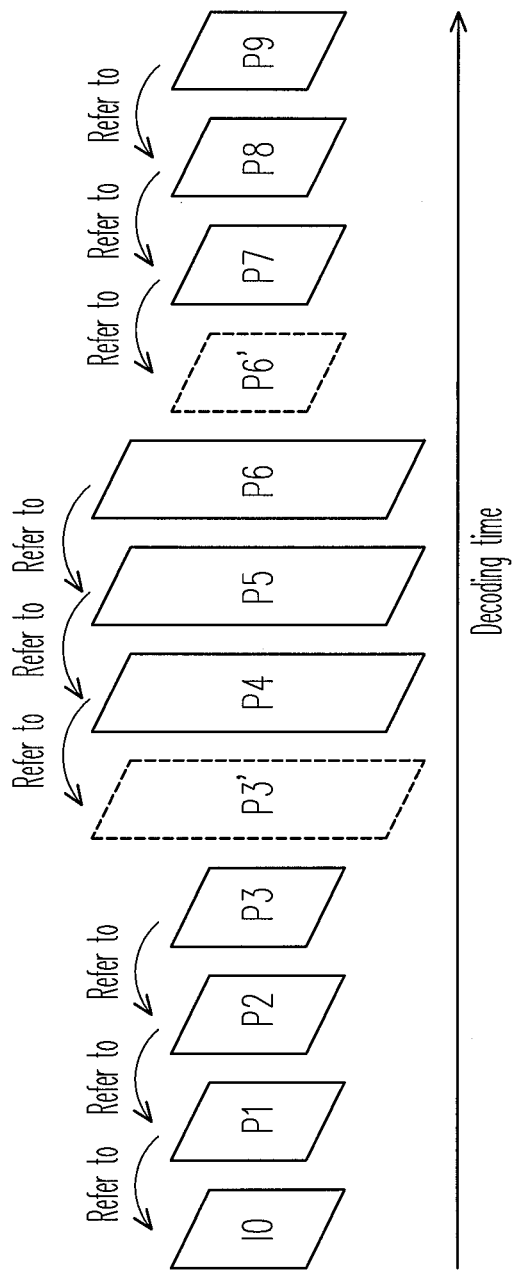
FIG. 5 is diagram illustrating a relation between decoding time and frames in a decoding process according to an algorithm applied by TMN 3.0 decoding program.

When the resampling reference picture processing unit 702 is in a disable state, a function of the video decoding system 70 is similar to that of the conventional video decoding system of FIG. 1. When the resampling reference picture processing unit 702 is in an enable state, the resampling reference picture processing unit 702 receives the block of the current frame output from the in-loop filter 75 and the indication signal output from the header look ahead unit 701, wherein the indication signal includes the specific information of the next P frame. Then, the resampling reference picture processing unit 702 establishes a resampling reference picture according to the specific information of the current frame and the next P frame output from the in-loop filter 75, and stores the resampling reference frame in the frame memory 79 or in the resampling reference picture processing unit 702 itself. Since the resolution of the resampling reference picture is the same as that of the next P frame, during a decoding process of the next P frame, the resampling reference picture can be referred to.

Figure 9:
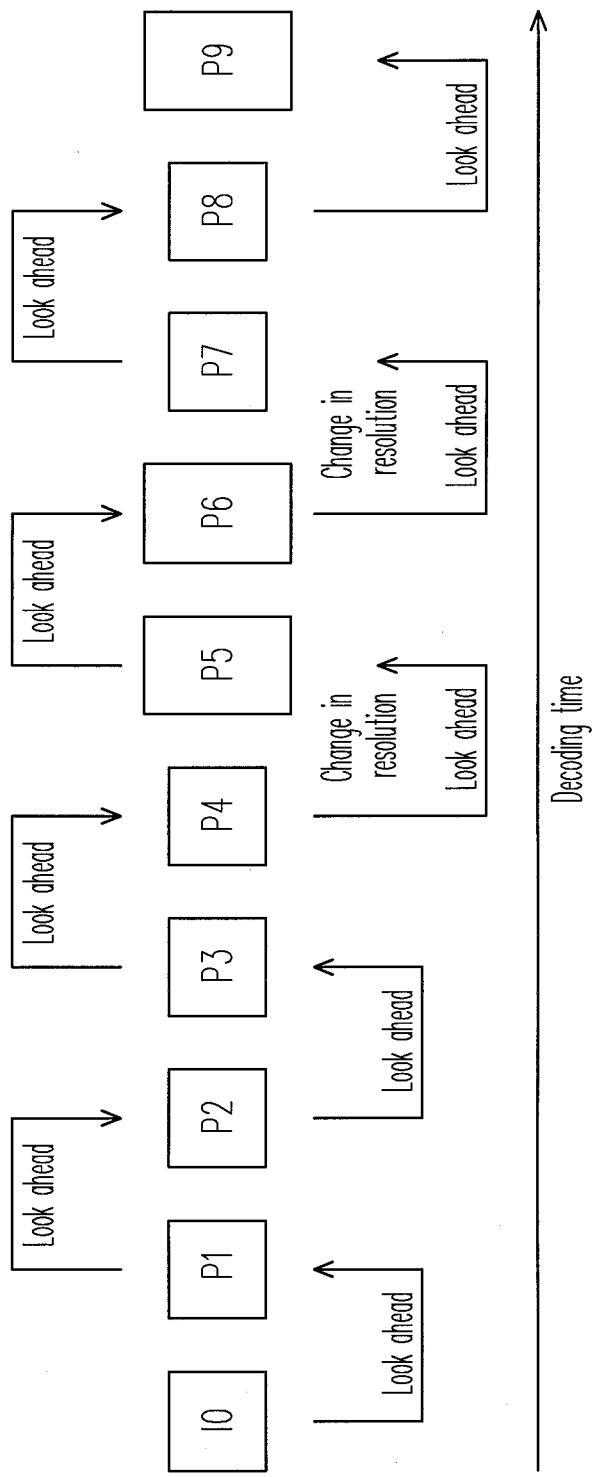
FIG. 9 is a diagram illustrating a relation between decoding time and frames during a decoding process of the video decoding system 70 according to an embodiment of the present invention.

Next, referring to FIG. 9, FIG. 9 is a diagram illustrating a relation between decoding time and frames during a decoding process of the video decoding system 70 according to an embodiment of the present invention. When the video decoding system 70 performs the decoding, the video decoding system 70 first decodes the I frame I0. While the I frame I0 is decoded, the header look ahead unit 701 looks ahead the specific information of a next frame to determine whether the next frame is a P frame and whether a resolution thereof is different from that of the current frame. Since the resolution of the I frame I0 and the resolution of the P frame P1 are the same, the resampling reference picture processing unit 702 is in the disable state. Next, when the P frame P1 is decoded, the I frame I0 must be referred to, so as to successfully decode the P frame P1. Now, the header look ahead unit 701 looks ahead the specific information of a next frame to determine whether the next frame is the P frame and whether a resolution thereof is different from that of the current frame. Since the resolutions of the P frames P1 and P2 are the same, the resampling reference picture processing unit 702 is in the disable state. The decoding processes of the P frames P2 and P3 can be deduced by analogy, and therefore detailed description thereof is not repeated.

When the P frame P4 is decoded, since the header look ahead unit 701 looks ahead the specific information of the next P frame P5, it can be known that the resolutions of the P frames P4 and P5 are different. Now, the resampling reference picture processing unit 702 is in the enable state, and the resampling reference picture processing unit 702 generates a resampling reference frame P4' having the same resolution as that of the P frame P5 while decoding the P frame P4. Next, the resampling reference picture P4' is stored, and when the P frame P5 is decoded, the reconstruction of the P frame P5 refers to the resampling reference frame P4' is referred. Moreover, according to the above description, those with ordinary skill in the art can easily deduce the decoding processes of the P frames P6-P9, and thereof detailed descriptions thereof are not repeated.

Figure 10:
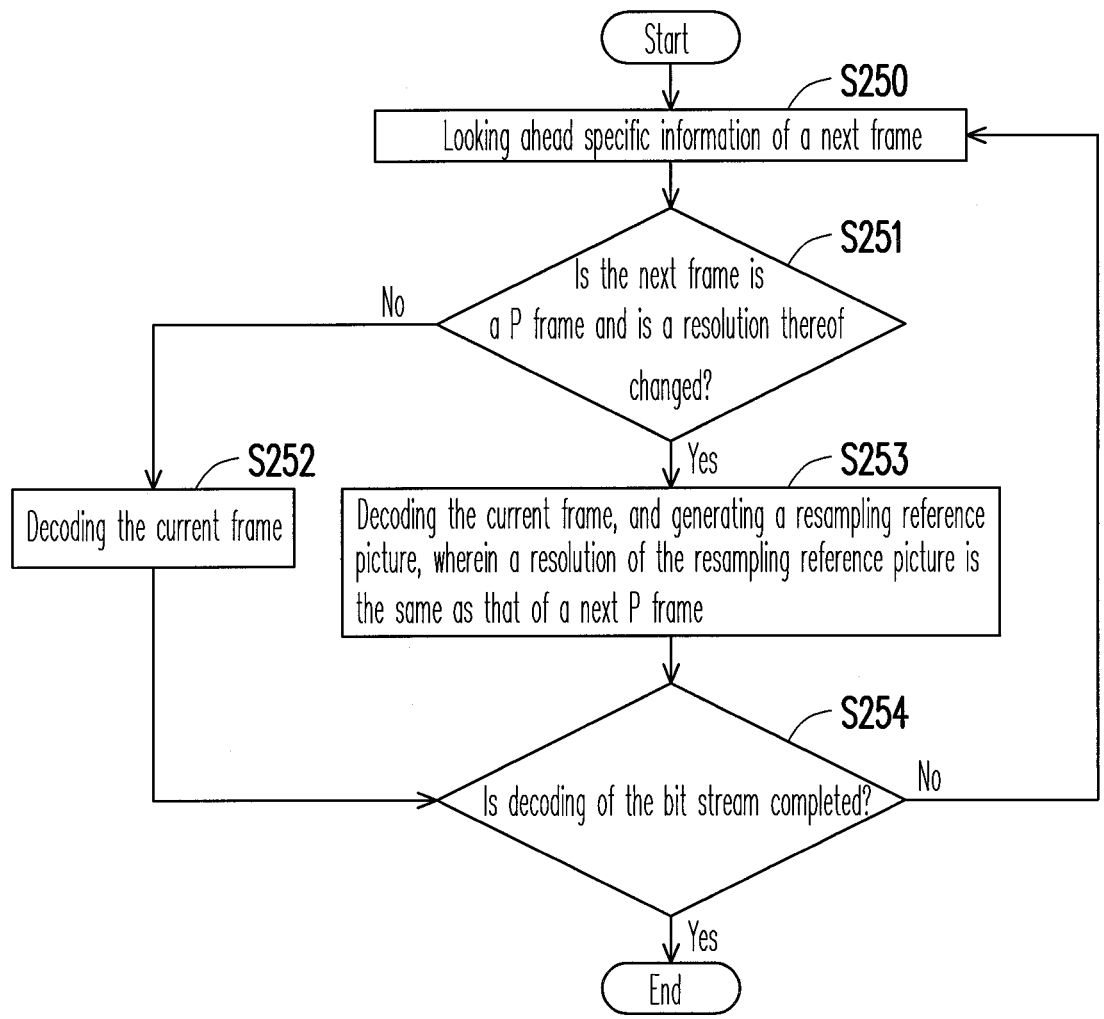
FIG. 10 is a flowchart illustrating a method for generating a resampling reference frame according to an embodiment of the present invention.

Next, referring to FIG. 10, FIG. 10 is a flowchart illustrating a method for generating a resampling reference frame according to an embodiment of the present invention. Though in the embodiment of FIG. 10, the bit stream only includes the I frame and the P frame, and x=1. However, the present invention is not limited thereto. Moreover, though in the embodiment of FIG. 10, resampling of the reference picture is performed in allusion to different resolutions between the frames, according to the above description, those with ordinary skill in the art should understand that resampling of the reference picture can also be performed in allusion to different shapes between the frames by suitably modifying the embodiment of FIG. 10.

First, in step S250, the specific information of the next frame is looked ahead. Wherein, the specific information of the next frame includes the resolution information or the frame shape information. Next, in step S251, whether the next frame is a P frame and whether a resolution thereof is changed are determined (i.e. whether the resolution of the next P frame is the same as that of the current frame is determined). If the next frame is an I frame, or the next frame is a P frame though the resolution thereof is the same as that of the current frame, step S252 is then executed. If the next frame is the P frame and the resolution thereof is different from that of the current frame, step S253 is then executed.

In the step S252, the current frame is decoded. In the step S253, the current frame is decoded, and a resampling reference picture is generated, wherein a resolution of the resampling reference picture is the same as that of a next P frame. Wherein, the generated resampling reference picture can serve as a reference picture during a decoding process of the next P frame. In step S254, whether decoding of the bit stream is completed is determined. If the decoding of the bit stream is completed, the decoding process of the bit stream is ended; otherwise, the step S250 is repeated.

Figure 11:
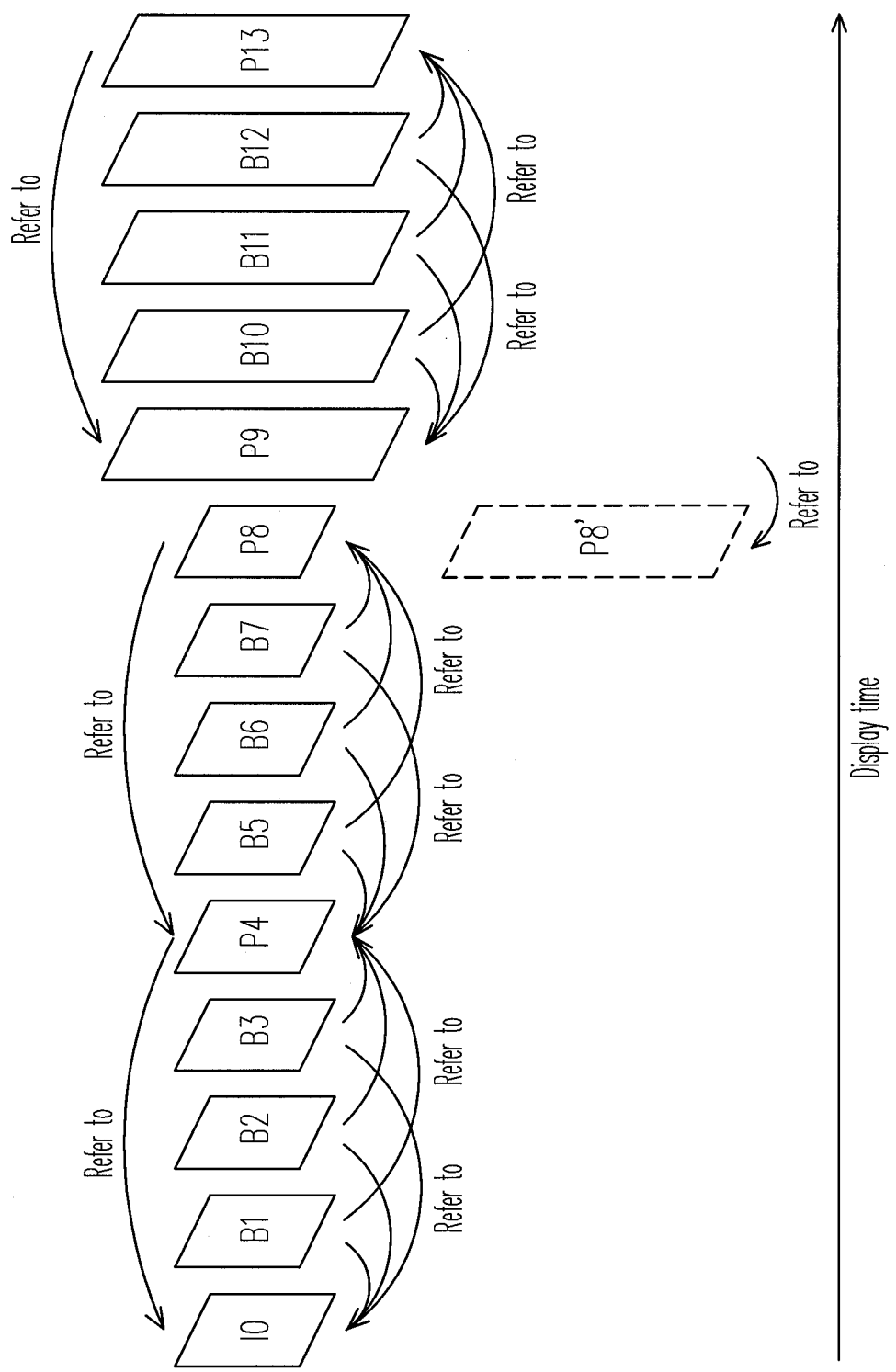
FIG. 11 is a schematic diagram illustrating frames and display time displayed by a display device after a bit stream is decoded, wherein resolutions of a part of the frames are different from that of a reference picture thereof.
Figure 12:
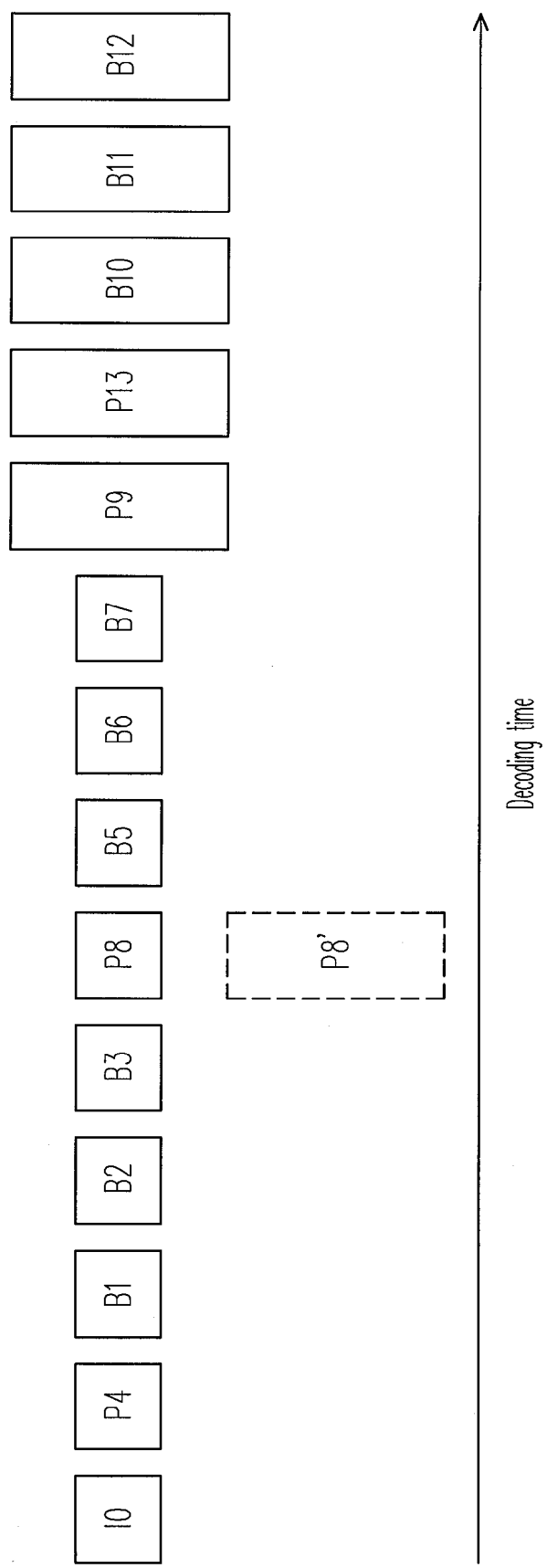
FIG. 12 is a schematic diagram illustrating decoding time corresponding to a plurality of the frames of FIG. 11.

Next, referring to FIG. 11 and FIG. 12, FIG. 11 is a schematic diagram illustrating frames and display time displayed by a display device after the bit stream is decoded. FIG. 12 is a schematic diagram illustrating decoding time corresponding to a plurality of the frames of FIG. 11. Wherein, resolutions of a part of the frames are different from that of the reference pictures thereof. As shown in FIG. 11 and FIG. 12, the bit stream includes the I frame I0, the P frames P4, P8, P9, P13 and the B frames B1-B3, B5-B7 and B10-B12. Wherein, a display sequence and a decoding sequence of the frames are respectively shown in FIG. 11 and FIG. 12.

However, it should be noted that resolutions of the P frames P8 and P9 in the bit stream are different. Therefore, during the decoding processes of the P frame P8 and the B frames B5-B7, a P frame P8' must be generated, so that the P frame P9 can refer to the P frame P8' during the decoding process of the P frame P9.

The video decoding system 70 of FIG. 7 is still applicable in case that the bit stream includes the I frame, the P frames and the B frames. In this case, referring to FIG. 7 again, operation processes of the resampling reference picture generation apparatus 700 and the video decoding system 70 are described as follows. Moreover, to maintain a premise of generality, in the following descriptions, a value of x is set to 5. However, the value of x is not used for limiting the present invention.

If the current frame is the non-B frame, the next 5 frames are not all B frames, the first non-B frame in the next 5 frames is the P frame, and the resolution information or the frame shape information included in the specific information of the P frame is different from that of the current frame, the header look ahead unit 701 then outputs the indication signal to enable the resampling reference picture processing unit 702. The resampling reference picture processing unit 702 generates a resampling reference picture according to the current frame and the specific information of the P frame in the next 5 frames. Wherein, the resolution and frame shape of the resampling reference frame are the same as those of the P frame in the next 5 frames. If the current frame is the non-B frame, and the next 5 frames are all B frames, the header look ahead unit 701 then outputs the indication signal to enable the resampling reference picture processing unit 702. The resampling reference picture processing unit 702 stores the bit stream of the current frame in the storage apparatus at a specific address, and sets a value of a resampling flag to be true. Wherein, the storage apparatus can be a storage apparatus of the resampling reference picture processing unit 702 itself, or can be an external memory, etc.

If the current frame is the B frame, and the next 5 frames are all the B frames, the header look ahead unit 701 outputs the indication signal to disable the resampling reference picture processing unit 702. Now, the operation of the video decoding device 710 is similar to that of the conventional video decoding system 10 of FIG. 1.

If the current frame is the B frame, the next 5 frames are not all B frames, the next frame is the P frame, and the resolution information or the frame shape information included in the specific information of the P frame is different from that of the current frame, the header look ahead unit 701 then outputs the indication signal to enable the resampling reference picture processing unit 702. The resampling reference picture processing unit 702 then determines whether the value of the resampling flag is true, and if the value of the resampling flag is true, the resampling reference picture processing unit 702 generates a resampling reference picture according to a previous non-B frame (i.e. the frame bit stream previously stored in the storage apparatus at the specific address) and the specific information of the next P frame corresponding to the current frame, and accordingly sets the value of the resampling flag to be false. If the value of the resampling flag is false, the resampling reference picture processing unit 702 does not generate the resampling reference picture. Wherein, the resolution and the frame shape of the resampling reference picture are the same as those of the next P frame. If the next frame is the I frame, or the resolution information or the frame shape information included in the specific information of the next P frame is the same as that of the current frame, the header look ahead unit 701 outputs the indication signal to disable the resampling reference picture processing unit 702, and sets the value of the resampling flag to be false. If the next frame is the B frame, the header look ahead unit 701 outputs the indication signal to disable the resampling reference picture processing unit 702, and the video decoding device 710 can perform the frame decoding according to a general decoding process, and now the resampling reference picture processing unit 702 does not generate the resampling reference picture, and the current value of the resampling flag is maintained.

Figure 13:
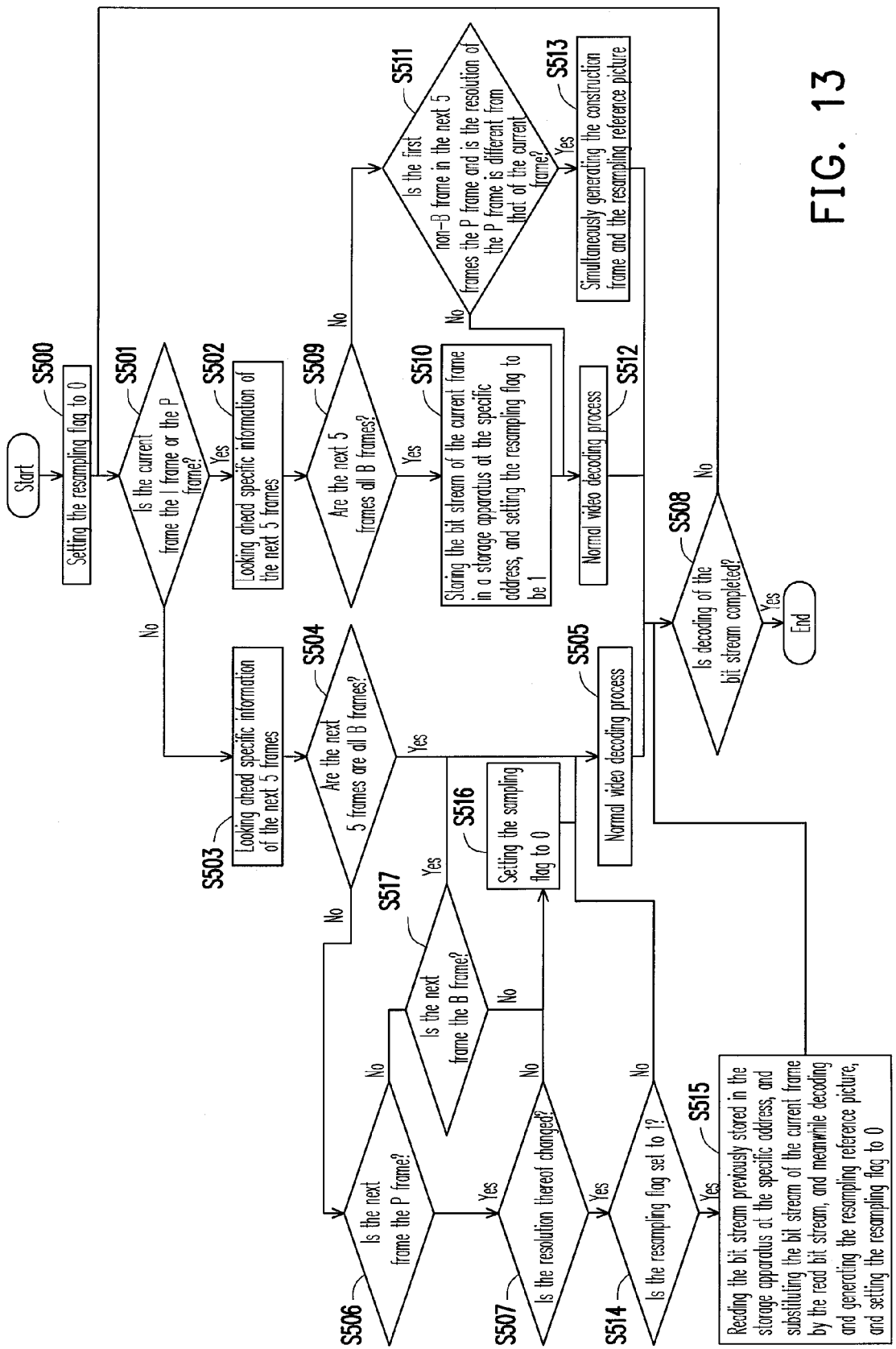
FIG. 13 is a flowchart illustrating a method for generating a resampling reference picture according to an embodiment of the present invention.

Next, referring to FIG. 13, FIG. 13 is a flowchart illustrating a method for generating a resampling reference picture according to an embodiment of the present invention. In the embodiment of FIG. 13, the bit stream includes the I frame, the P frame and the B frame. The method for generating a resampling reference picture is executed in a video decoding system, and the video decoding system receives and decodes the bit stream to obtain a plurality of reconstruction frames. Here, a current reconstruction frame is referred to as the current frame. Wherein, the value of x can be changed according to actual requirements. To maintain a premise of generality, in the following descriptions, the value of x is set to 5. However, the value of x is not used for limiting the present invention.

First, in step S500, the resampling flag is set to 0. Next, in step S501, whether the current frame is the I frame or the P frame is determined, namely, whether the current frame is the non-B frame is determined. If the current frame is the non-B frame, step S502 is executed; otherwise, step S503 is executed.

If the current frame is the non-B frame, in the step S502, specific information of the next 5 frames is looked ahead. Next, in step S509, whether the next 5 frames are all B frames is determined. If the next 5 frames are all B frames, step S510 is executed; otherwise, step S511 is executed. If the next 5 frames are not all B frames, in the step S511, whether the first non-B frame in the next 5 frames is the P frame and whether the resolution of the P frame is different from that of the current frame are determined.

If an above judgement result is negative, step S512 is executed, and if the above judgement result is affirmative, step S513 is executed. In the step S513, the video decoding system still decodes the bit stream to generate the reconstruction frames. According to the method for generating the resampling reference picture, while the bit stream is decoded, the resampling reference picture is generated according to the current frame and the specific information of the P frame. Wherein, the resolution and the frame shape of the resampling reference picture are the same as those of the P frame. Next, step S508 is executed.

If the next 5 frames are all B frames, in the step S510, the bit stream of the current frame is stored in the storage apparatus at the specific address, and the resampling flag is set to 1. Next, in step S512, the video decoding system performs a normal decoding process, and does not generate the resampling reference picture. Next, the step S508 is executed.

If the current frame is the B frame, in the step S503, the specific information of the next 5 frames is looked ahead. Next, in step S504, whether the next 5 frames are all B frames is determined. If the next 5 frames are all B, step S505 is executed; otherwise, step S506 is executed. If the next 5 frames are all B frames, in the step S505, the video decoding system normally performs the video decoding process, and does not generate the resampling reference picture. Next, the step S508 is executed.

If the next 5 frames are not all B frames, in the step S506, whether the next frame is the P frame is determined. If the next frame is the P frame, in step S507, whether the resolution of the P frame is different from that of the current frame is determined. If the resolution of the P frame is different from that of the current frame, in step S514, whether the resampling flag is 1 is determined. If the resampling flag is 1, step S515 is executed. If the next frame is not the P frame, step S517 is executed to determine whether the next frame is the B frame. If the next frame is the B frame, in the step S505, the video decoding system normally performs the video decoding process, and does not generate the resampling reference picture, and the current value of the resampling flag is maintained. If the next frame is neither the P frame nor the B frame (i.e., the next frame is the I frame), step S516 is executed to set the resampling flag to 0, and then the step S505 is executed, by which the video decoding system normally performs the video decoding process.

In other words, only when the next frame is the P frame, the resolution thereof is different from that of the current frame, and the value of the resampling flag is true, is the step S515 executed.

In the step S515, the bit stream previously stored in the storage apparatus at the specific address is read. Namely, a non-B frame previous to the current frame is read. Next, the video decoding system decodes the bit stream of the non-B frame to generate the reconstruction frame. According to the method for generating the resampling reference picture, while the bit stream is decoded, the resampling reference picture is generated according to the next P frame and the specific information of the non-B frame, and the resampling flag is set to 0. Wherein, the resolution and the frame shape of the resampling reference picture are the same as those of the next P frame. Next, the step S508 is executed. However, it should be noted that in the method of the present embodiment, the value of the resampling flag set to 0 represents false, and the value of the resampling flag set to 1 represents true, though the representing method of false and true of the value of resampling flag is not limited thereto.

In the step S508, whether decoding of each of the frames in the bit stream is completed is determined. If the decoding of each of the frames in the bit stream is completed, the method for generating the resampling reference picture is completed; otherwise, the step S501 is repeated.

In summary, the resampling reference picture generation apparatus, the method thereof and the video decoding system using the same can generate the resampling reference pictures and decode the current frame in parallel, so that the video decoding system can simultaneously generate the reference pictures with different resolutions during the decoding process. Therefore, an operation clock number of a computer device can be reduced, and requirement of a memory bandwidth can be greatly reduced due to data reuse.

Moreover, the resampling reference picture generation apparatus, the method thereof and the video decoding system using the same are applicable in case that the bit stream includes the I frames, the P frames and the B frames, and the value of x is varied according to different encoders or different requirements of the user. Moreover, in case that the bit stream only includes the I frames and the P frames, the value of x is set to 1, thus the resampling reference picture generation apparatus with a lower calculation complexity, the method thereof and the video decoding system using the same can be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating a resampling reference picture, executed in a video decoding system, the video decoding system being used to decode a bit stream, so as to obtain a current frame, the method for generating a resampling reference picture comprising:

obtaining specific information of at least one next x frame of the current frame in the bit stream when the current frame is reconstructed and the at least one next x frame has not been reconstructed, wherein x is a natural number;

if the obtained specific information of the at least one next x frame is different from that of the current frame, generating the resampling reference picture according to the obtained specific information of the at least one next x frame; and after the current frame is reconstructed and the resampling reference picture is generated, reconstructing the at least one next x frame by referring to the resampling reference picture.

2. The method for generating a resampling reference picture as claimed in claim 1, wherein the obtained specific information of the at least one next x frame comprises a start code and a related parameter corresponding to each frame of the at least one next x frame, wherein the related parameter of each frame in the at least one next x frame comprises resolution information or frame shape information.

3. The method for generating a resampling reference picture as claimed in claim 1, wherein when the frames contained in the bit stream are all non-B frames, x is 1, and resolution information or frame shape information contained in the specific information of a next P frame is different from that of the current frame, the method for generating the resampling reference picture further comprises:

generating the resampling reference picture according to the specific information of the current frame and the next P frame, wherein a resolution and a frame shape of the resampling reference picture is the same as those of the next P frame.

4. The method for generating a resampling reference picture as claimed in claim 1, wherein when the frames contained in the bit stream are all non-B frames, x is 1, and resolution information or frame shape information contained in the obtained specific information of the at least one next P frame is the same as that of the current frame, the resampling reference picture is not generated.

5. The method for generating a resampling reference picture as claimed in claim 1, wherein when the current frame is a non-B frame, the next x frames are not all B frames, a first non-B frame in the at least one next x frame is a P frame, and resolution information or frame shape information contained in the specific information of the P frame is different from that of the current frame, the resampling reference picture is generated according to the current frame and the specific information of the P frame in the at least one next x frame, wherein the resolution and the frame shape of the resampling reference picture are the same as those of the P frame in the at least one next x frame.

6. The method for generating a resampling reference picture as claimed in claim 1, wherein when the current frame is a non-B frame, and the next x frames are all B frames, the method for generating the resampling reference picture further comprises:

storing a bit stream of the current frame in a storage apparatus at a specific address, and setting a value of a resampling flag to be true.

7. The method for generating a resampling reference picture as claimed in claim 1, wherein when the current frame is a B frame, and the at least one next x frame is B frame, the resampling reference picture is not generated, and the video decoding system decodes the bit stream according to a general decoding process.

8. The method for generating a resampling reference picture as claimed in claim 1, wherein when the current frame is a B frame, x is larger than 1, the next x frames are not all B frames, the next frame is a P frame, and when resolution information or frame shape information contained in the specific information of the P frame is different from that of the current frame, the method for generating the resampling reference picture further comprises:

determining whether a value of a resampling flag is true; and if the value of the resampling flag is true, generating the resampling reference picture according to a previous non-B frame and the specific information of the P frame corresponding to the current frame, and setting the value of the resampling flag to be false, wherein a resolution and the frame shape of a resampling reference picture are the same as those of the P frame.

9. The method for generating a resampling reference picture as claimed in claim 1, wherein when the current frame is a B frame, x is larger than 1, the next x frames are not all B frames, and if the next frame is an I frame or the next frame is a P frame, or resolution information or frame shape information contained in the obtained specific information of the P frame is the same as that of the current frame, the method for generating the resampling reference picture further comprises:

decoding the bit stream by the video decoding system according to the general decoding process, and setting a value of a resampling flag to be false.

10. The method for generating a resampling reference picture as claimed in claim 1, wherein when the current frame is a B frame, x is larger than 1, the next x frames are not all B frames, and if the next frame is a B frame, the method for generating the resampling reference picture further comprises:

decoding the bit stream by the video decoding system according to the general decoding process, and maintaining a current value of a resampling flag.

11. The method for generating a resampling reference picture as claimed in claim 1, wherein the step of generating the resampling reference picture according the obtained specific information of the at least one next x frame is performed while reconstruction of the current frame is completed.

12. The method for generating a resampling reference picture as claimed in claim 1, further comprising:

if the obtained specific information of the at least one next x frame of the current frame is different from that of the current frame, temporarily storing resolution information of the next x frame before the resampling reference picture is generated, and temporarily storing the resampling reference picture after the resampling reference picture is generated and before the at least one next x frame is reconstructed.

13. A resampling reference picture generation apparatus, adapted to a video decoding system, the video decoding system being used to decode a bit stream, so as to obtain a current frame, the resampling reference picture generation apparatus comprising:

a header look ahead unit, for obtaining specific information of at least one next x frame of the current frame in the bit stream, and outputting an indication signal according to the obtained specific information of the at least one next x frame when the current frame is reconstructed, wherein x is a natural number; and a resampling reference picture processing unit, coupled to the header look ahead unit, generating a resampling reference picture according to the indication signal if the obtained specific information of the at least one next x frame is different from that of the current frame, wherein after the current frame is reconstructed and the resampling reference picture is generated, the at least one next x frame is reconstructed by referring to the resampling reference picture.

14. The resampling reference picture generation apparatus as claimed in claimed 13, wherein the obtained specific information of the at least one next x frame comprises a start code and a related parameter corresponding to each frame of the at least one next x frame, wherein the related parameter of each frame in the at least one next x frame comprises resolution information or frame shape information.

15. The resampling reference picture generation apparatus as claimed in claimed 13, wherein when the frames contained in the bit stream are all non-B frames, x is 1, and when resolution information or frame shape information contained in the specific information of a next P frame is different from that of the current frame, the indication signal enables the resampling reference picture processing unit, and the resampling reference picture processing unit generates the resampling reference picture according to the current frame and the specific information of the next P frame, wherein a resolution and a frame shape of the resampling reference picture are the same as those of the next P frame.

16. The resampling reference picture generation apparatus as claimed in claimed 13, wherein when the frames contained in the bit stream are all non-B frames, x is 1, and when resolution information or frame shape information contained in the specific information of the next P frame is the same as that of the current frame, the indication signal disables the resampling reference picture processing unit.

17. The resampling reference picture generation apparatus as claimed in claimed 13, wherein when the current frame is a non-B frame, x is larger than 1, the next x frames are not all B frames, a first non-B frame in the next x frames is a P frame, and resolution information or frame shape information contained in the specific information of the P frame is different from that of the current frame, the indication signal enables the resampling reference picture processing unit, and the resampling reference picture processing unit generates the resampling reference picture according to the current frame and the specific information of the P frame in the next x frames, wherein a resolution and a frame shape of the resampling reference picture are the same as those of the P frame in the next x frames.

18. The resampling reference picture generation apparatus as claimed in claimed 13, wherein when the current frame is a non-B frame, and the at least one next x frame is B frame, the resampling reference picture processing unit stores a bit stream of the current frame in a storage apparatus a at a specific address, and sets a value of a resampling flag to be true.

19. The resampling reference picture generation apparatus as claimed in claimed 13, wherein when the current frame is a B frame, and the at least one next x frame is B frame, the indication signal disables the resampling reference picture processing unit, and the video decoding system decodes the bit stream according to a general decoding process.

20. The resampling reference picture generation apparatus as claimed in claimed 13, wherein when the current frame is a B frame, x is larger than 1, the next x frames are not all B frames, the next frame is a P frame, and when resolution information or frame shape information contained in the specific information of the P frame is different from that of the current frame, the indication signal enables the resampling reference picture processing unit, and the resampling reference picture processing unit determines whether a value of a resampling flag is true, and if the value of the resampling flag is true, the resampling reference picture processing unit generates the resampling reference picture according to a previous non-B frame and the specific information of the next P frame corresponding to the current frame, and sets the value of the resampling flag to be false, wherein a resolution and a frame shape of the resampling reference picture is the same as those of the next P frame.

21. The resampling reference picture generation apparatus as claimed in claimed 13, wherein when the current frame is a B frame, x is larger than 1, the next x frames are not all B frames, and if the next frame is an I frame or the next frame is a P frame, or resolution information or frame shape information contained in a specific information thereof is the same as that of the current frame, the indication signal disables the resampling reference picture processing unit, and the video decoding system decodes the bit stream according to the general decoding process, and resampling reference picture processing unit sets a value of a resampling flag to be false.

22. The resampling reference picture generation apparatus as claimed in claimed 13, wherein when the current frame is a B frame, x is larger than 1, the next x frames are not all B frames, and if the next frame is a B frame, the indication signal disables the resampling reference picture processing unit, and the video decoding system decodes the bit stream according to the general decoding process, and resampling reference picture processing unit maintains a current value of a resampling flag.

23. The resampling reference picture generation apparatus as claimed in claimed 13, wherein the resampling reference picture processing unit generates the resampling reference picture according the obtained specific information of the at least one next x frame while reconstruction of the current frame is completed.

24. The resampling reference picture generation apparatus as claimed in claimed 13, if the obtained specific information of the at least one next x frame of the current frame is different from that of the current frame, the resampling reference picture processing unit temporarily stores resolution information of the next x frame before the resampling reference picture is generated, and temporarily stores the resampling reference picture after the resampling reference picture is generated and before the at least one next x frame is reconstructed.

25. A video decoding system, comprising:
a video decoding device, decoding a bit stream to obtain a current frame; and
a resampling reference picture generation apparatus, coupled to the video decoding device, comprising:
a header look ahead unit, for obtaining specific information of at least one next x frame of the current frame in the bit stream when the current frame is reconstructed, and outputting an indication signal according to the obtained specific information of the next x frames, wherein x is a natural number; and
a resampling reference picture processing unit, coupled to the header look ahead unit, generating a resampling reference picture according to the indication signal if the obtained specific information of the at least one next x frame is different from that of the current frame,
wherein after the current frame is reconstructed and the resampling reference picture is generated, the at least one next x frame is reconstructed by referring to the resampling reference picture.

26. The video decoding system as claimed in claim 25, wherein the obtained specific information of the at least one next x frame comprises a start code and a related parameter corresponding to each frame of the at least one next x frame, wherein the related parameter of each frame in the at least one next x frames comprises resolution information or frame shape information.

27. The video decoding system as claimed in claim 25, wherein when the frames contained in the bit stream are all non-B frames, x is 1, and when resolution information or frame shape information contained in the specific information of a next P frame is different from that of the current frame, the indication signal enables the resampling reference picture processing unit, and the resampling reference picture processing unit generates the resampling reference picture according to the current frame and the specific information of the next P frame, wherein a resolution and a frame shape of the resampling reference picture is the same as those of the next P frame.

28. The video decoding system as claimed in claim 25, wherein when the frames contained in the bit stream are all non-B frames, x is 1, and when the resolution information or the frame shape information contained in the specific information of the next P frame is the same as that of the current frame, the indication signal disables the resampling reference picture processing unit.

29. The video decoding system as claimed in claim 25, wherein when the current frame is a non-B frame, x is larger than 1, the next x frames are not all B frames, a first non-B frame in the next x frames is a P frame, and resolution information or frame shape information contained in the specific information of the P frame is different from that of the current frame, the indication signal enables the resampling reference picture processing unit, and the resampling reference picture processing unit generates the resampling reference picture according to the current frame and the specific information of the P frame in the next x frames, wherein a resolution and a frame shape of the resampling reference picture are the same as those of the P frame in the next x frames.

30. The video decoding system as claimed in claim 25, wherein when the current frame is a non-B frame, x is larger than 1, and the next x frames are all B frames, the resampling reference picture processing unit stores a bit stream of the current frame in a specific space address, and sets a value of a resampling flag to be true.

31. The video decoding system as claimed in claim 25, wherein when the current frame is a B frame, and the next x frame is B frame, the indication signal disables the resampling reference picture processing unit, and the video decoding system decodes the bit stream according to a general decoding process.

32. The video decoding system as claimed in claim 25, wherein when the current frame is a B frame, x is larger than 1, the next x frames are not all B frames, the next frame is a P frame, and when resolution information or frame shape information contained in the specific information of the P frame is different from that of the current frame, the indication signal enables the resampling reference picture processing unit, and the resampling reference picture processing unit determines whether a value of a resampling flag is true, and if the value of the resampling flag is true, the resampling reference picture processing unit generates the resampling reference picture according to a previous non-B frame and the specific information of the next P frame corresponding to the current frame, and sets the value of the resampling flag to be false, wherein a resolution and a frame shape of the resampling reference picture is the same as those of the next P frame.

33. The video decoding system as claimed in claim 25, wherein when the current frame is a B frame, x is larger than 1, the next x frames are not all B frames, and if the next frame is an I frame or the next frame is a P frame, or resolution information or frame shape information contained in the specific information thereof is the same as that of the current frame, the indication signal disables the resampling reference picture processing unit, and the video decoding system decodes the bit stream according to the general decoding process, and resampling reference picture processing unit sets a value of a resampling flag to be false.

34. The video decoding system as claimed in claim 25, wherein when the current frame is a B frame, x is larger than 1, the next x frames are not all B frames, and if the next frame is a B frame, the indication signal disables the resampling reference picture processing unit, and the video decoding system decodes the bit stream according to the general decoding process, and maintains the current value of a resampling flag.

35. The video decoding system as claimed in claim 25, wherein the resampling reference picture processing unit generates the resampling reference picture according the obtained specific information of the at least one next x frame while reconstruction of the current frame is completed.

36. The video decoding system as claimed in claim 25, if the obtained specific information of the at least one next x frame of the current frame is different from that of the current frame, the resampling reference picture processing unit temporarily stores resolution information of the next x frame before the resampling reference picture is generated, and temporarily stores the resampling reference picture after the resampling reference picture is generated and before the at least one next x frame is reconstructed.

37. A method for generating a resampling reference picture, executed in a video decoding system, the video decoding system being used to decode a bit stream, so as to obtain a current frame, the method for generating a resampling reference picture comprising:
    obtaining specific information of next x frames of the current frame in the bit stream when the current frame is reconstructed, wherein x is a natural number, the obtained specific information comprises resolution information or frame shape information, and the next x frames are unreconstructed;
    when the current frame is a non-B frame, and the next x frames are all B frames, storing a bit stream of the current frame in a storage apparatus at a specific address, and setting a value of a resampling flag to be true;
    when the current frame is a B frame, the next x frames are not all B frames, one of the next x frame is a P frame, the P frame refers to the current frame, and when the resolution information or the frame shape information contained in the specific information of the P frame is different from that of the current frame, determining whether the value of the resampling flag is true; and
    if the value of the resampling flag is true, generating the resampling reference picture according to a previous non-B frame and the specific information of the P frame, and setting the value of the resampling flag to be false, wherein the resolution or the frame shape of the resampling reference picture are the same as those of the P frame, and the P frame refers to the resampling reference picture.

* * * * *